US009146099B2

(12) United States Patent
O'Connell et al.

(10) Patent No.: US 9,146,099 B2
(45) Date of Patent: Sep. 29, 2015

(54) METHOD AND SYSTEM FOR THERMALLY MONITORING PROCESS FOR FORMING PLASTIC BLOW-MOLDED CONTAINERS

(75) Inventors: Patrick M. O'Connell, Hershey, PA (US); Garrett R. Pennington, Manheim, PA (US); Russell Varone, Red Lion, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 309 days.

(21) Appl. No.: 13/176,850

(22) Filed: Jul. 6, 2011

(65) Prior Publication Data

US 2012/0007289 A1    Jan. 12, 2012

Related U.S. Application Data (60) Provisional application No. 61/362,188, filed on Jul. 7, 2010.

(51) Int. Cl.
*G01B 21/08* (2006.01)
*B29C 49/42* (2006.01)
(Continued)

(52) U.S. Cl.
CPC .............. *G01B 21/085* (2013.01); *B29C 49/42* (2013.01); *B29C 49/78* (2013.01); *B29C 49/04* (2013.01); *B29C 49/36* (2013.01); *B29C 2949/78151* (2013.01); *B29C 2949/78512* (2013.01);
(Continued)

(58) Field of Classification Search
CPC .................................................... G01B 21/085
USPC .......................................................... 264/406
See application file for complete search history.

(56) References Cited

U.S. PATENT DOCUMENTS 3,356,212 A * 12/1967 Landin .......................... 209/526
3,943,214 A    3/1976 Turek
(Continued)

FOREIGN PATENT DOCUMENTS

DE        10355440       6/2005
DE      102006034432    1/2008
(Continued)

OTHER PUBLICATIONS

Bendada et al. ("Understanding heat transfer mechanisms during the cooling phase of blow molding using infrared thermography" NDT&E International 38, 433-441 (2005)).*
(Continued)

*Primary Examiner* — Larry Thrower
(74) *Attorney, Agent, or Firm* — Stradley Ronon Stevens & Young, LLP (57) ABSTRACT

The present invention provides a method of measuring the placement of material forming a blow-molded plastic container after the container is released from a mold of a blow molder having a plurality of molds, wherein each plastic container comprises a continuous sidewall and a base, the method comprising the steps of: detecting with an infrared camera infrared light emitted from the container after the container is released from a mold; converting the detected infrared light into corresponding electrical signals; transmitting the electrical signals to a microprocessor; comparing in the microprocessor the electrical signals with stored data regarding desired material distribution forming the plastic container; and producing output information regarding the placement of material forming the container.

6 Claims, 7 Drawing Sheets
(5 of 7 Drawing Sheet(s) Filed in Color)

(51) Int. Cl.
*B29C 49/78* (2006.01)
*B29C 49/04* (2006.01)
*B29C 49/36* (2006.01)

(52) U.S. Cl.
CPC ............. *B29C2949/78605* (2013.01); *B29C 2949/78663* (2013.01)

(56) References Cited

U.S. PATENT DOCUMENTS

| | | | |
|---|---|---|---|
| 5,486,575 | A | 1/1996 | Shroff |
| 5,539,675 | A | 7/1996 | Carroll, Sr. et al. |
| 6,117,506 | A | 9/2000 | Graboski et al. |
| 6,863,860 | B1 | 3/2005 | Birckbichler et al. |
| 6,962,670 | B1 | 11/2005 | Hanson et al. |
| 7,374,713 | B2 | 5/2008 | Birckbichler et al. |
| 7,378,047 | B2 | 5/2008 | Birckbichler et al. |
| 2004/0024560 | A1* | 2/2004 | Shelby et al. .................. 702/130 |
| 2006/0058911 | A1 | 3/2006 | Schnabel |
| 2006/0214321 | A1 | 9/2006 | Semersky et al. |
| 2009/0278286 | A1 | 11/2009 | Schmidt et al. |
| 2010/0007060 | A1* | 1/2010 | Linke et al. .................. 264/454 |

FOREIGN PATENT DOCUMENTS

| | | |
|---|---|---|
| DE | 102008052608 | 5/2010 |
| EP | 1342550 | 9/2003 |
| WO | 01/65204 | 9/2001 |
| WO | WO 2007/110018 * | 4/2007 |

OTHER PUBLICATIONS

"Invista develops PET resin for extrusion blow molding" Plastics News Report posted Jan. 20, 2010 PlasticsNews.com (as printed Jun. 10, 2010 from http://plasticsnews.com/headlines2.html?id=17630).

Reynolds, Pat "2 packaging developments worth watching" Pat's packaging blog—packworld.com, Jan. 21, 2010 (as printed Jun. 10, 2010 from http://www.packworld.com/print.php?id=29058).

* cited by examiner

METHOD AND SYSTEM FOR THERMALLY MONITORING PROCESS FOR FORMING PLASTIC BLOW-MOLDED CONTAINERS

CROSS-REFERENCE TO RELATED APPLICATIONS

This application claims the benefit of priority under 35 U.S.C. §119(e) to earlier filed U.S. patent application Ser. No. 61/362,188, filed on Jul. 7, 2010, the disclosure of which is incorporated herein by reference in its entirety.

BACKGROUND OF THE INVENTION

The present invention provides a method and apparatus for measuring the placement of material throughout a plastic blow-molded containers and, more specifically, it relates to the use of an infrared camera and a microprocessor to measure the placement of material forming the plastic blow-molded container by comparing the temperature profile images of a bottle selected as a standard and the temperature profile image of a freshly blown bottle.

Although the present invention is described primarily in connection with an extrusion blow molding, the skilled artisan will appreciate that the method of the present invention will also apply to other blow molding processes such as, for example, injection and stretch blow molding processes.

In the packaging industry there is a continuous effort to reduce the overall weight of the package. Weight reduction translates into a reduction of material and shipping costs. One of the hurdles faced by packaging engineers is to ensure that lighter weight packages have the minimum amount of material while meeting specifications for strength and integrity. Achieving this balance often means that there is only a very small margin for error and better automated processes are always being sought.

One of the difficulties in blow molding plastic containers is the problem of maintaining the proper placement of plastic in a parison so that the blow-molded container has uniform wall thickness and/or has the desired amounts of plastic in the desired locations on the container. Ill-placed plastic in a container wall may translate into defects in the containers that, in turn, may affect the structural integrity of the container for its intended use. Moreover, ill-placed material in a container may indicate that there is a serious problem with the process, such as, for example, a clogged screen or foreign objects in the process lines that affect the flow of the plastic.

One way to measure placement of material in a plastic blow-molded container is for an operator to manually remove containers from an output conveyor, cut them open, and measure the vertical wall thickness distribution. If the distribution is not satisfactory, the measurement data can indicate how the process needs to be adjusted. In some cases, there is a critical location where one measurement can indicate how the process is running. For example, if one area of the sidewall is too thick, the additional thickness can indicate that some other area is running too thin.

Wall thickness distribution information must be acquired as quickly as possible. If the manufacturing process is out of specification limits, a large quantity of scrap material can be generated before such determination is made and the appropriate correction implemented. The manual sectioning and measurement of the wall thickness distribution can be tedious, time consuming, and inaccurate. Consequently, the manufacturing process results in a large variation in container wall thickness, rarely approaching the optimum distribution necessary for achieving a desired minimum weight of the final container.

On-line automated processes to measure wall thickness of blow molded plastic containers have been developed to address the foregoing concerns. For example, U.S. Pat. Nos. 6,863,860, 7,374,713, and 7,378,047 to Birckbichler et al. ("the Birckbichler patents") disclose a method of inspecting wall thickness of blow-molded plastic containers wherein the method involves impinging infrared light thereon and detecting the portion of infrared light that passes through the container and converting the same into corresponding electrical signals that are delivered to a microprocessor. The microprocessor compares the electrical signals with stored information regarding desired wall thickness of the container and emits output thickness information. In such method, the microprocessor receives signals from sensors associated with the blow-molder relating to the position of the molds, the identity of the molds and the identity of the spindles in order that the wall thickness information that is determined by inspection can be associated with specific molds and spindles. This method, however, suffers from at least the following three drawbacks.

First, the method disclosed in the Birckbichler patents requires multiple IR emitters and IR detectors to determine thickness. The emitter sends out the IR wave from one side of the package, while the detector senses the IR wave from the other side of the package. Such configuration is expensive, complex, and difficult to maintain in continuous working operation.

Moreover, since the method disclosed in the Birckbichler patents relies on radiation passing through the container, so the containers must be clear for the method to be effective.

Finally, the method disclosed in the Birckbichler patents takes data points only where the emitter and detectors are aimed and, thus, is incapable of measuring wall thickness continuously (i.e., without interruption) along the side of the container wall.

Accordingly, there is a need in the art for an on-line, automated method of measuring material placement in a blow-molded plastic bottle that does not suffer from the above-identified drawbacks.

BRIEF SUMMARY OF THE INVENTION

The present invention satisfies this need by providing a method of measuring the placement of material forming a blow-molded plastic container after the container is released from a mold of a blow molder having a plurality of molds, wherein each plastic container comprises a continuous sidewall and a base, the method comprising the steps of: detecting with an infrared camera infrared light emitted from the container after the container is released from a mold; converting the detected infrared light into corresponding electrical signals; transmitting the electrical signals to a microprocessor; comparing in the microprocessor the electrical signals with stored data regarding desired material distribution forming the plastic container; and producing output information regarding the placement of material forming the container.

In another aspect, the present invention provides a method of controlling a blow molding production line based on measuring the placement of material forming a blow-molded plastic container produced on the production line, the method comprising the steps of: providing an extrusion blow molding machine having a plurality of molding stations each comprising a mold and a parison extruding system, wherein the extrusion blow molding machine provides an output of plastic blow-molded containers, wherein each plastic container comprises a continuous sidewall and a base; measuring the placement of material forming the sidewall and base of the containers by: detecting with an infrared camera infrared light emitted from the container; converting the detected infrared light into corresponding electrical signals; transmitting to a microprocessor the electrical signals; comparing in the microprocessor the electrical signals with stored data regarding desired material distribution forming the plastic container; and producing output information regarding the placement of material forming the plastic container and, if the output information indicates that a bottle has a material distribution that is a deviation from the desired material distribution, manually performing at least one of the following steps: adjusting at least one parameter of the extrusion blow molding machine to bring material placement within the desired material distribution; and stopping the production line.

In yet another aspect, the present invention provides a method of controlling a blow molding production line based on measuring the placement of material forming a blow-molded plastic container produced on the production line, the method comprises the steps of: providing an extrusion blow molding machine having a plurality of molding stations each comprising a mold and a parison extruding system, wherein the extrusion blow molding machine provides an output of plastic blow-molded containers, wherein each plastic container has a continuous sidewall and a base; measuring the placement of material in the sidewall and base of the containers by: detecting with an infrared camera infrared light emitted from the container; converting the detected infrared light into corresponding electrical signals; transmitting the electrical signals to a microprocessor; comparing in the microprocessor the electrical signals with stored data regarding desired material distribution forming the plastic container; and producing output information regarding the placement of material forming the plastic container and, if the output information indicates that a container has a material distribution that is a deviation from the stored data regarding desired material distribution, performing in the microprocessor at least one of the following steps: activating a rejection chute to reject the deviant container; adjusting at least one parameter of the extrusion blow molding machine to bring material placement within the desired material distribution; and stopping the production line.

In yet another aspect, the present invention provides an apparatus for measuring the placement of material forming a plastic blow-molded container, the apparatus comprising: a blow molder having a plurality of molds used to form a plurality of plastic containers, wherein each plastic container has a continuous sidewall and a base; an infrared camera that detects infrared light emitted from each of the plurality of plastic containers; and a microprocessor that receives electrical signals from the infrared camera and determines whether material distribution in the sidewall and base of the containers are within desired reference limits stored in the microprocessor.

According to the present invention, a system for measuring the material distribution of a plastic blow-molded container is integrated with a multiple station production machine wherein each of the stations is used repetitively in turn. As a result, it is possible separately to analyze the performance of each station. Unlike container inspection systems of the prior art, the system and method of the present invention is less complex, can measure all blow molded bottles regardless of bottle color or clarity, and can measuring wall thickness continuously along the entire container.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

As used herein, the term "containers" refers to plastic bottles, jars, vials and other plastic containers usable for storage of liquid and other flowable materials. Examples of the size of containers for which the present invention is particularly well suited are containers having a capacity of about 0.2 to 3 liters, although large volume packages such as, for example, 55 gallon drums are also contemplated by the present invention.

As used herein, the term "material placement" or "placement of material in a blow-molded plastic container" generally refers to the thickness characteristics of a blow-molded plastic bottle including the thickness of the overall wall, base, and neck finish of the container and also to particular areas of the container wall, base, and neck that may contain too much or too little plastic material relative to a desired amount of material for the particular location in the container.

Blow-molded plastic containers according to the present invention are those made from plastics such as, for example, polyethylene (PE), such as high-density polyethylene (HDPE), medium-density polyethylene; low-density polyethylene (LDPE), cross-linked high-density polyethylene (XLPE), linear low-density polyethylene (LLDPE), ultra low-density polyethylene, and very low-density polyethylene; polycarbonate (PC); polypropylene (PP); polypropylene copolymer (PPCO); polyallomer (PA); polymethylpentene (PMP or TPX); polyketone (PK); polyethylene terephthalates (PET), including polyethylene terephthalate G copolymer (PETG) and oriented PET; EPET; polystyrene (PS); polyvinylchloride (PVC); naphthalate; polybutylene terephthalate; thermoplastic elastomer (TPE); mixtures thereof; and the like. Such plastics are suitable for use in consumer food and household chemical and automotive markets, and pharmaceutical packaging. In preferred embodiments, the plastic material further includes a colorant such that the plastic blow-molded container is substantially opaque to light.

In a typical prior art extrusion blow mold process, a hot tube of plastic material (a "parison") is dropped from an extruder and captured in a water cooled mold. Once the molds are closed, air is injected through the top or the neck of the container. When the hot plastic material is blown up and touches the walls of the mold the material "freezes" and the material then maintains the rigid shape of the mold.

In such process, there are a number of potential problems that could result in poor material distribution in the blown container. For example, dirt or other impurities can contaminate the melted polymer and affect the polymers melt and flow properties; the screen in the extruder screen changer can become clogged; there can be a heating element failure; a misaligned flow head; and there can be die pin problems that affect the die gap which, in turn, affects the container wall thickness.

By employing the apparatus and method of the present invention, preferably located within the blow molder near the output portion where the containers are extracted from the molds, the material distribution throughout the container can be readily determined as described in more detail below.

Figure 1:
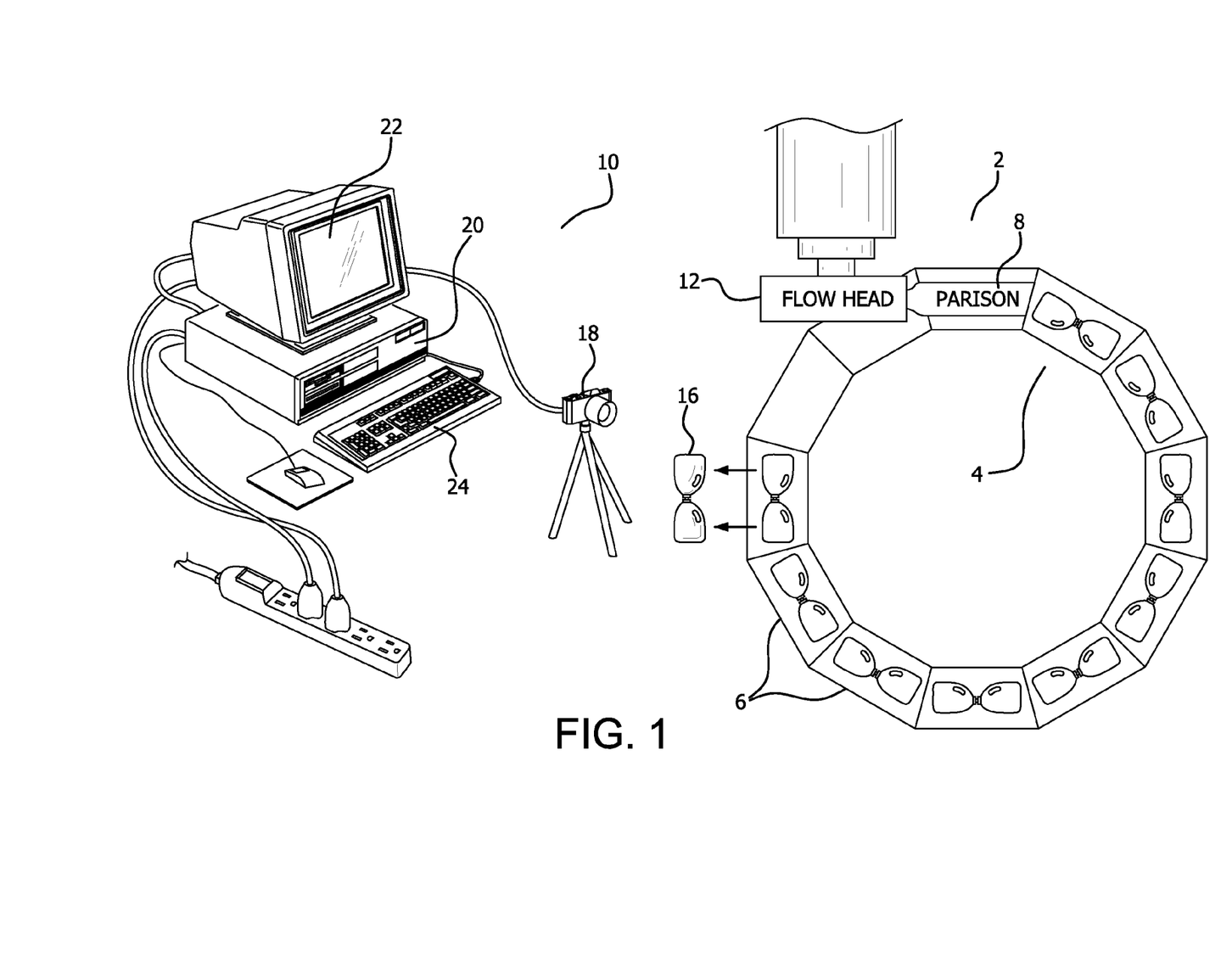
FIG. 1 is a schematic plan view of the apparatus according to the present invention.

Apparatus and Method of Measuring the Placement of Material in a Blow-Molded Container In one embodiment, the method of the present invention is a method of measuring the placement of material in a blow-molded plastic container. This method comprises providing a plastic container blow molder having a plurality of molds and providing an output of plastic containers, wherein each plastic container has a continuous sidewall and a base. As used herein, the term "sidewall" or "container sidewall" is used herein to refer to the longer walls of a plastic blow-molded container, regardless of the container's shape, and includes a handle portion if applicable. As used herein, the term "base" of the container refers to the bottom of the bottle; the surface upon which the bottle stands. Referring to FIG. 1, an embodiment of an apparatus according to the present invention is shown, which includes and exemplary blow molding machine. The exemplary blow molding machine of FIG. 1 is an extrusion blow molding machine 2 having a rotary wheel 4 that includes multiple mold stations 6. In the blow molding machine shown in FIG. 1, the rotary wheel 4 has twelve mold stations. Parison 8 is extruded through flow head 12 where a water-cooled mold 14 clamps and closes on parison 8. A needle (not shown) then pierces the parison through which air is blown thus forming a container in the shape of the mold 14. As rotary portion 4 rotates, the mold is released and the plastic blow-molded blown container 16 is ejected for further processing. Although FIG. 1 depicts a rotary wheel-type blow molding machine, one of ordinary skill in the art will appreciate that the method of the present invention can be employed on any type of blow molding machine, whether having a single stage/station or multiple stages/stations.

The method of the present invention further includes the steps of measuring the placement of material forming the sidewall and base of the containers by detecting the infrared light emittance with an infrared camera and converting the detected infrared light into corresponding electrical signals which are transmitted to a microprocessor. Still referring to FIG. 1, there is shown an inspection station which has a plastic blow-molded container 16 passing there through as it is released from the rotary wheel 4 in the direction indicated by the arrows under the influence of a suitable conveyance device (not shown). An infrared camera 18 is in communication with microprocessor 20, which, in turn, is connected to an output device 22 (e.g., a monitor) and keyboard 24. A suitable infrared camera 18 for use in accordance with the present invention is, for example, the Fluke Thermal Imager IR Flexcam® Ti40 (Fluke Corporation, Everett, Wash.). Output device 22 receives output information from microprocessor 20. In operation, infrared camera 18 detects infrared light and, therefore, the amount of heat emitted from container 16 and converts the detected infrared light into corresponding electrical signals which are delivered to microprocessor 20 for further processing as described in more detail below.

Infrared camera 18 operates on the principle that all objects emit a certain amount of black body radiation as a function of their temperatures. Generally speaking, the higher an object's temperature is, the more infrared radiation, or "black-body" radiation, it emits. When viewed graphically, the brightest (warmest) parts of the image are typically colored white, intermediate temperatures reds and yellows, and the dimmest (coolest) parts blue. Because plastic is a good insulator, not only do plastic blow-molded containers retain heat, but they retain heat in different amounts throughout their profile because plastic containers require different amounts of plastic in different locations on the container. For example, a container's base portion typically requires more plastic relative to the label area. With respect to heat retention, it is known that thicker areas (areas with more material) on a plastic container retain heat longer than, for example, thinner areas (areas with less material). Thus, thicker areas will typically be hotter out of the molds and will emit more infrared radiation.

Because of the relatively low thermal energy emitted from the container, one of ordinary skill in the art will appreciate that special conditions may need to be considered to optimize image quality (which also may be a function of the quality of the camera being employed). For example, the camera may need to be shielded from the surrounding environment or a longer exposure time of the camera may be needed. Also, the ordinarily skilled artisan will appreciate that to capture the image, either the camera may have to move with the container being measured or the conveyor may have to temporarily stop or the container will have to be ejected onto an imaging station.

Figure 2:
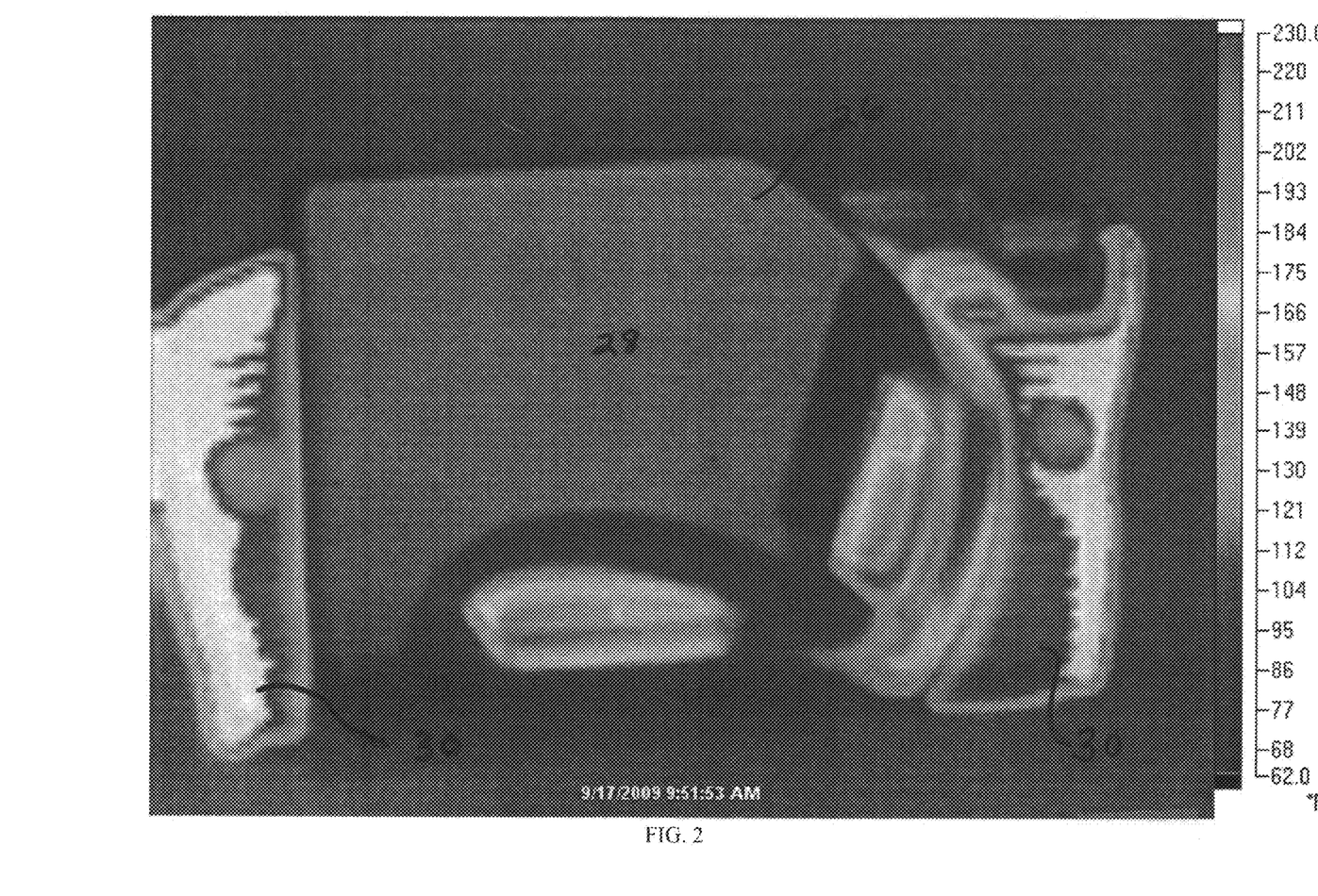
FIG. 2 is an infrared image of a plastic blow-molded container without a defect.

The method of the present invention further includes the steps of comparing in the microprocessor the electrical signals with stored data regarding desired material distribution throughout the plastic container and producing output information regarding the placement of material throughout the container. An infrared temperature profile can be input to a microprocessor as a standard reference temperature profile for a given container whose material placement is independently considered to meet desired material placement requirements for that container. Thus, the apparatus of the present invention operates to measure the placement of material in, for example, the sidewall and base of a plastic blow-molded container by employing infrared camera 18 to detect the infrared light emittance as the containers are released from the molds onto, for example, a discharge conveyor. The infrared camera 18 converts the detected infrared light into corresponding electrical signals which are transmitted to microprocessor 20, which compares the electrical signals with stored reference data regarding desired material distribution throughout the plastic blow-molded container 16. Output information is thus produced by the microprocessor which may be shown on output device 22. Referring to FIG. 2, in one embodiment, the output information is in the form of a visual image showing the infrared temperature profile of a container. The infrared image in FIG. 2 shows an infrared image of an HDPE oil container 26 twenty seconds after it was taken out of a mold (before flash 30 is removed). The sidewall 28 of the container shown in the image in FIG. 2 generally has a uniform material distribution throughout the sidewall as evidenced by the uniform color/shade of the sidewall.

It has been found that the average wall thickness values obtained by the method of the present invention agree very closely with manual measurements made by carefully sectioning and physical gauging of plastic blow-molded containers.

Method of Controlling a Blow Molding Production Line (I)

In view of the above method for measuring the placement of material in a blow-molded plastic container, in another embodiment, the present invention provides a method of controlling a blow molding production line based on measuring the placement of material forming a blow-molded plastic container produced on the production line as described above. This embodiment includes the steps detailed above with respect to measuring the placement of material in a blow-molded plastic container, and further includes the following steps based upon the output information provided by the microprocessor 20. If the output information from microprocessor 20 indicates that a bottle (or bottles) has a material distribution that is a deviation from the desired material distribution, manually performing at least one of the following steps: (i) adjusting at least one parameter of the extrusion blow molding machine to bring material placement within the desired material distribution; and (ii) stopping the production line.

Figure 3:
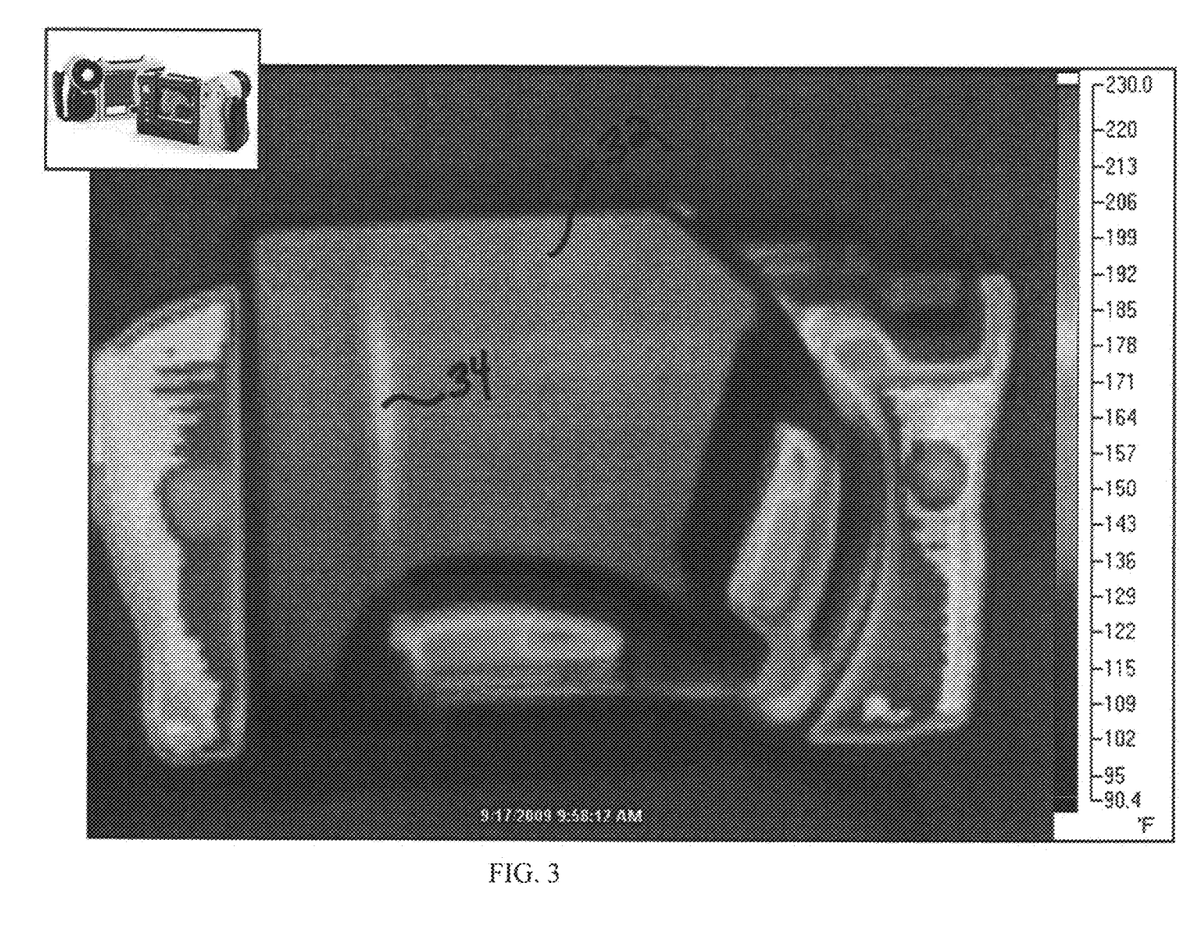
FIG. 3 is an infrared image of a plastic blow-molded container having a defect.
Figure 4:
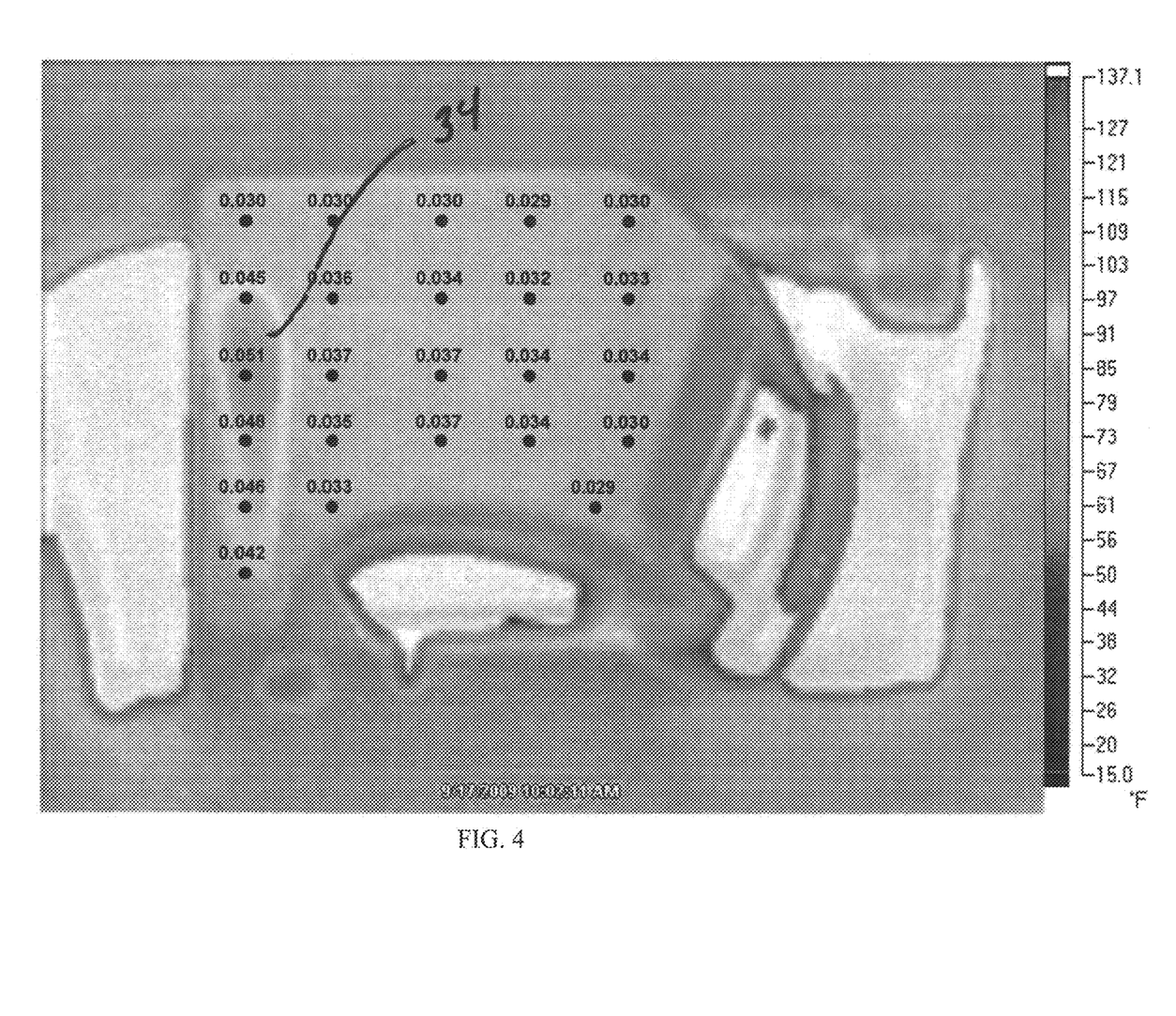
FIG. 4 is an infrared image of the plastic blow-molded container of FIG. 3 with wall thickness measurements overlaid on the image.
Figure 5:
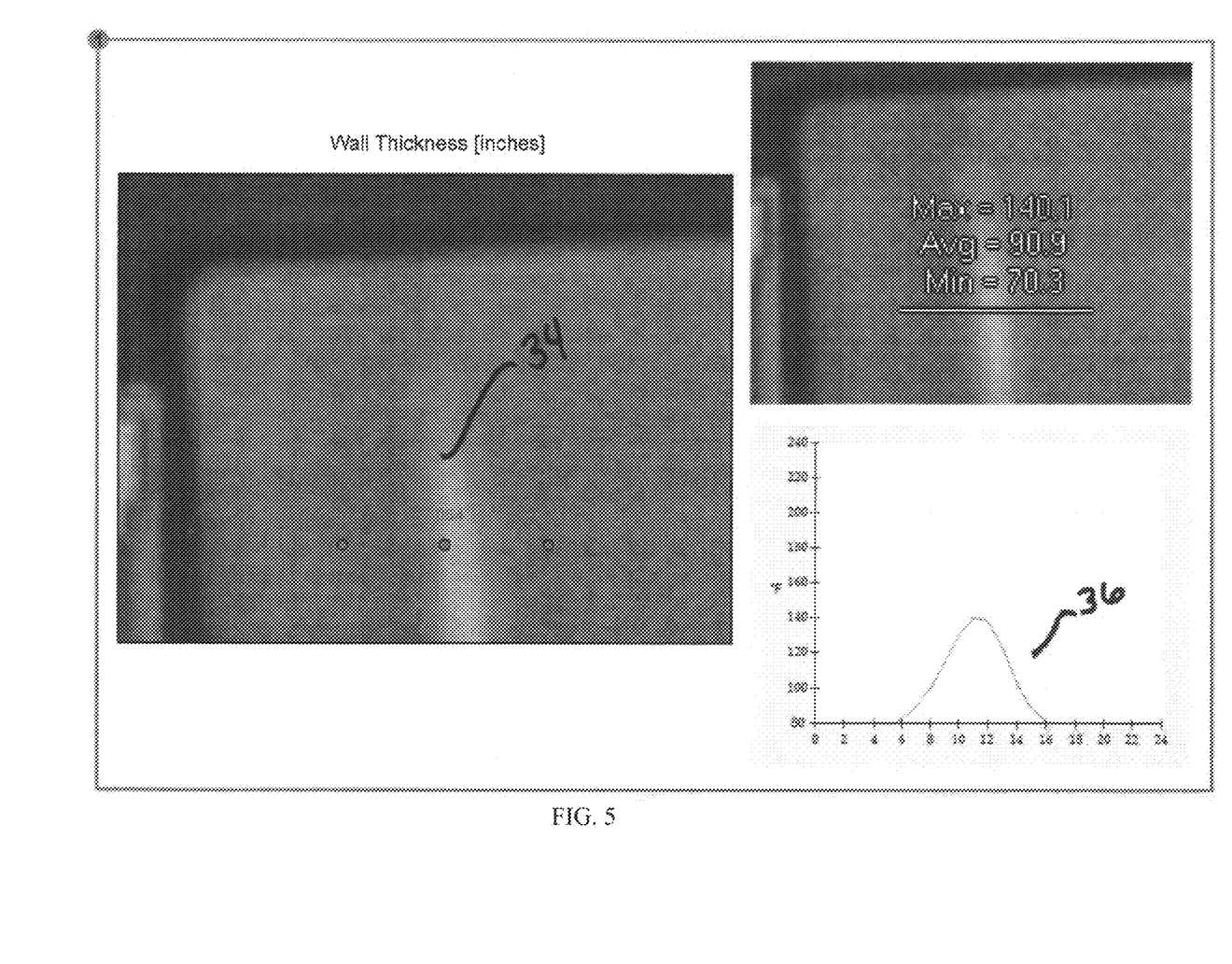
FIG. 5 is an infrared image of the plastic blow-molded container of FIG. 3 with a temperature profile to illustrate an aspect of the present invention.

FIGS. 3 to 6 illustrate this embodiment of the method of the present invention. FIG. 3 shows the visual image of an infrared temperature profile of a blow-molded HDPE oil container 32 twenty seconds after its release from a mold. The output information from microprocessor 20 indicates that container 32 has a defect 34 characterized by a non-uniform material distribution in the sidewall of the container (compare FIG. 3 with FIG. 2). As shown in FIG. 4, defect 34 is shown as a thicker area of the sidewall in thousandths of an inch. FIG. 5, shows a temperature profile 36 of defect 34 relative to the surrounding portion of the sidewall. The increase in temperature directly correspond with the thickness measurements shown in FIG. 4. As detailed above, thicker areas (areas with more material) on a plastic container retain heat longer than, for example, thinner areas (areas with less material). Thus, thicker areas will typically be hotter out of the molds and will emit more infrared radiation.

Figure 6A:
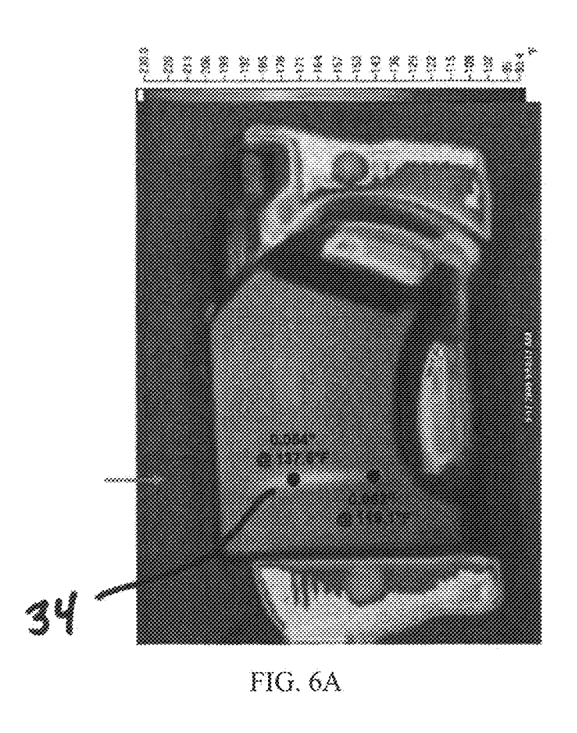
FIG. 6A is the same infrared image of a plastic blow-molded container shown in FIG. 3 for comparison with the image in FIG. 6B.
Figure 6B:
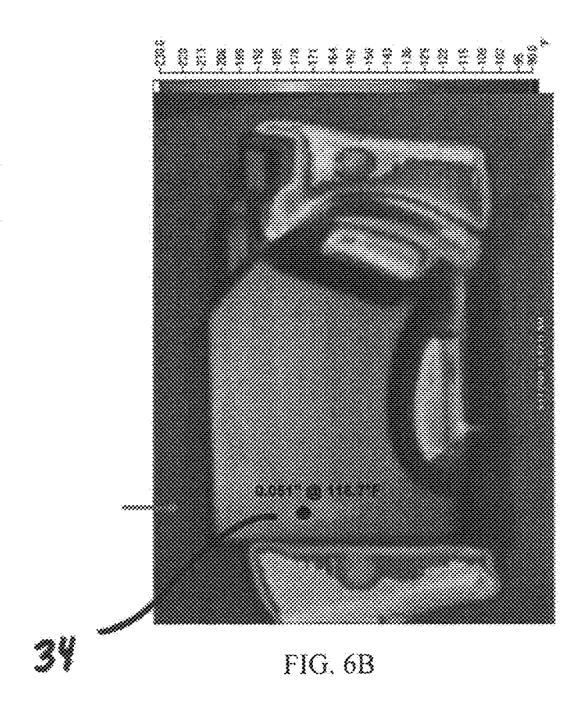
FIG. 6B is an infrared image of a plastic blow-molded container having a defect and after operator adjustment of at least one process parameter of an extrusion blow molding machine.

Once an operator has identified that information from the microprocessor indicates that a bottle (or bottles) has a material distribution that deviates from the desired material distribution, the operator can adjust at least one parameter of the extrusion blow molding machine to bring material placement within the desired material distribution. For example, the defect may indicate a phase mis-alignment in the parison programmer. As is well-known to the skilled artisan, a parison programmer is used to raise or lower a die pin to increase or decrease the die gap at the extruder head, which directly determines a container's thickness profile. In response, the operator can, for example, shift a pin in the parison programmer to achieve the desired material distribution in the blow-molded plastic container. For example, FIGS. 6A and 6B show two blow-molded HDPE containers twenty seconds after release from the mold. The container in FIG. 6A is the same container shown in FIGS. 3-5. The container in FIG. 6B shows that the position of the material distribution that formed defect 34 moved toward the base 38 of the container after an operator adjusted a pin in the parison programmer.

Thus, the method of the present invention can be employed not only to identify and correct undesired placement of material in a blow-molding process, but can be employed to monitor the progress of correction efforts.

Alternatively, and depending on the extent of the deviation from the desired material distribution, the operator can stop the production line to make the required adjustments.

In another embodiment, microprocessor 20 also compares the electrical signals of the plastic blow-molded containers from each station in rotary wheel 4 of the production line with stored reference data regarding desired material distribution throughout the plastic blow-molded container and determines whether there is a station-to-station and/or a cycle-to-cycle variation. If a variation is detected, output information notifies an operator by producing visual information and/or an audio alarm.

For example, if microprocessor output device 22 is a display that highlights one mold station that is producing containers having undesirable material distribution—either, for example, too thick or too thin—the operator would adjust mold-related parameters such as, for example, blow-pressure or blow-rate to correct the problem; or the operator might need to stop the blow-molder to replace or repair an air valve for that mold. It will be appreciated that the mold station correlated feedback provided by the microprocessor is used to localize the problem.

Method of Controlling a Blow Molding Production Line (II)

In view of the above method for measuring the placement of material in a blow-molded plastic container, in another embodiment, the present invention provides a method of controlling a blow molding production line based on measuring the placement of material in a blow-molded plastic container produced on the production line as described above. This embodiment includes the steps detailed above with respect to measuring the placement of material in a blow-molded plastic container, and further includes the following steps based upon the output information provided by the microprocessor, which is integrated with the blow molding production line. If the output information indicates that a bottle has a material distribution that deviates from the stored data regarding desired material distribution, performing in the microprocessor at least one of the following steps: (1) activating a rejection chute to reject the bottle; (2) adjusting at least one parameter of the extrusion blow molding machine to bring material placement within the desired material distribution; and (3) stopping the production line.

Figure 7:
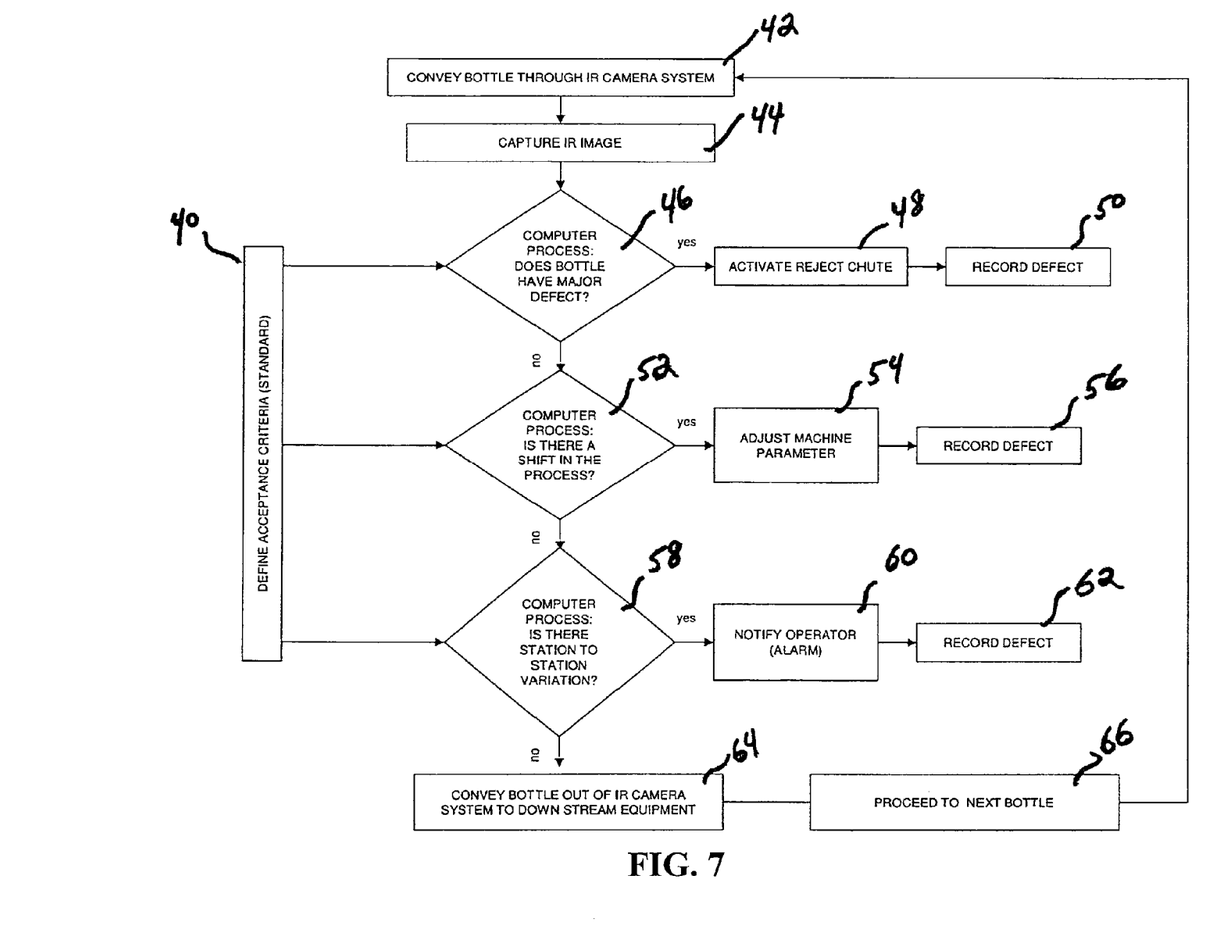
FIG. 7 is a flow chart illustrating an embodiment of the present invention.

Referring to FIG. 7 (with reference to the apparatus of FIG. 1), a flow diagram of the process is shown. In block 40, standard material distribution for a given container is input to the microprocessor as a reference. In preferred embodiments, the standard material distribution for a given container is added to the microprocessor 20 as a series of electrical signals from an infrared camera in communication with the microprocessor (which may be the same infrared camera on the production line). In block 42 and block 44 a bottle from a production line is conveyed through infrared camera 18 and its infrared image is captured and converted into corresponding electrical signals which are delivered to the microprocessor 20. At block 46, microprocessor 20 compares the electrical signals of the plastic blow-molded container from the production line with stored reference data regarding desired material distribution throughout the plastic blow-molded container. If a major defect is detected, then the microprocessor activates a reject chute and records the defect (blocks 48 and 50, respectively). As used herein, the term "major defect" refers to a container having an overall average temperature or localized temperature that is more than 10° F. deviated from the target temperature (i.e., from the reference standard).

Referring now to block 52, if no major defect is detected, microprocessor 20 compares the electrical signals of the plastic blow-molded container from the production line with stored reference data regarding desired material distribution throughout the plastic blow-molded container and determines whether a defect is present thus indicating a deviation from the stored data regarding desired material distribution, then the microprocessor sends a signal to the blow molding machine to adjust at least one parameter of the machine and records the defect (blocks 54 and 56, respectively). For example, in the embodiment described above with reference to FIGS. 3-6, the microprocessor, which is integrated with the blow molding machine (integration not shown in FIG. 1), sends a signal to the parison programmer to re-align the phase alignment of the parison program for the particular container.

Referring now to block 58, if no defect is detected, microprocessor 20 compares the electrical signals of the plastic blow-molded containers from each station in rotary wheel 4 of the production line with stored reference data regarding desired material distribution throughout the plastic blow-molded container and determines whether there is a station-to-station variation. If a station-to-station variation is detected, then an operator is notified by, for example, the sounding of an alarm and the defect is recorded (blocks 60 and 62, respectively).

Still referring to FIG. 7, if the bottle is free of defects in material distribution relative to the reference information, the plastic blow-molded container is conveyed to down stream equipment and the process is repeated on the next bottle (blocks 64 and 66, respectively).

Method of Controlling a Blow Molding Production Line (III)

In another embodiment, the present invention provides a method of controlling process parameters of a blow molding production line based on measuring the infrared temperature profile of a blow-molded plastic container produced on the production line as described above. This embodiment includes the steps detailed above with respect to measuring the placement of material in a blow-molded plastic container, and further includes the following steps based upon the output information provided by the microprocessor, which is integrated with the blow molding production line. If the output information indicates that a process parameter such as, for example, material temperature, is deviated from the stored data regarding the desired process parameter, performing in the microprocessor at least one of the following steps: (1) adjusting at least one parameter of the extrusion blow molding machine to bring the process parameter within the desired setting; and (2) stopping the production line.

Referring again to FIG. 7 (with reference to the apparatus of FIG. 1), a flow diagram of the process is shown. This embodiment will be explained in terms of material temperature but equally applies to other process parameters such as pressure and material flow. In block 40, standard temperature profile for a given freshly blown container is input to the microprocessor as a reference. In preferred embodiments, the standard temperature profile for a given container is added to the microprocessor 20 as a series of electrical signals from an infrared camera in communication with the microprocessor (which may be the same infrared camera on the production line). In block 42 and block 44 a bottle from a production line is conveyed through infrared camera 18 and its infrared image is captured and converted into corresponding electrical signals which are delivered to the microprocessor 20. At block 52, microprocessor 20 compares the electrical signals of the plastic blow-molded container from the production line with stored reference data regarding temperature profile throughout the plastic blow-molded container, which may include the flash. If the temperature profile is more than, for example, 10° F. over or under that for the stored reference data, then the microprocessor sends a signal to the blow molding machine to adjust, for example, the parison program and records the defect (blocks 54 and 56, respectively). In another example, if the average bottle indicates that the bottles are running hot (i.e., greater than 10° F. over that for the stored reference data), then the microprocessor sends a signal to the blow molder to change the extruder screen pack, which could be an automated or manual process. If such process is manual, then the microprocessor sends a signal to an alarm (audio or visual) to alert the operator that action needs to be taken. Alternatively, the microprocessor can be programmed to stop the production line if integrated or the operator can manually shut down the production line based on the output data.

Referring now to block 58, if no defect is detected, microprocessor 20 compares the electrical signals of the plastic blow-molded containers from each station in rotary wheel 4 of the production line with stored reference data regarding the standard temperature profile throughout the plastic blow-molded container and determines whether there is a station-to-station variation. If a station-to-station variation is detected, then an operator is notified by, for example, the sounding of an alarm and the defect is recorded (blocks 60 and 62, respectively).

It will be appreciated that the present invention has provided an improved system for wall thickness determination in a plastic blow-molded container which, as a result of the cooperation of an infrared camera and a microprocessor operatively associated with a blow-molder, provides detailed information so as to correlate wall thickness of a given container with the mold process parameters and mold station at which it is made. The microprocessor processes data regarding the thickness measurement and outputs the same to a unit which may visually display and record thickness readings such that an operator can adjust process parameters if a defect is observed by the infrared camera and microprocessor.

From the foregoing description, one of ordinary skill in the art can readily ascertain the essential characteristics of this invention and, without departing from the spirit and scope thereof, can make various changes and modifications to the invention to adapt it to various usages and conditions. For example, one of ordinary skill in the art would be able to employ the apparatus and method of the present invention on thermoforming, injection molding, or injection-stretch blow molding processes.

The invention claimed is:

1. A method of measuring the placement of material forming a blow-molded plastic container after the container is released from a mold of a blow molder having a plurality of molds, wherein each plastic container comprises a continuous sidewall and a base, the method comprising the steps of:

inputting to a microprocessor a temperature profile of a reference container as a standard reference temperature profile to define stored data, wherein the reference container has a material distribution that meets desired material placement requirements for that reference container;

blow molding into a mold a plastic container defined as a second container;

detecting heat emitted from the second container via infrared light with an infrared camera to form an infrared image of the second container after the second container is released from the mold;

converting the detected infrared light image into corresponding electrical signals;

transmitting the electrical signals to the microprocessor;

comparing in the microprocessor the electrical signals with the stored data regarding desired material distribution; and producing output information regarding the placement of material forming the second container.

2. The method of claim 1 wherein the blow molder is an extrusion blow molder.

3. The method of claim 2 wherein the extrusion blow molder comprises a plurality of blow mold stations.

4. The method of claim 2 wherein the material comprises a plastic selected from the group consisting of: polyethylene (PE), such as high-density polyethylene (HDPE), medium-density polyethylene; low-density polyethylene (LDPE), cross-linked high-density polyethylene (XLPE), linear low-density polyethylene (LLDPE), ultra low-density polyethylene, and very low-density polyethylene; polycarbonate (PC); polypropylene (PP); polypropylene copolymer (PPCO); polyallomer (PA); polymethylpentene (PMP or TPX); polyketone (PK); polyethylene terephthalates (PET), including polyethylene terephthalate G copolymer (PETG) and oriented PET; polystyrene (PS); polyvinylchloride (PVC); naphthalate; polybutylene terephthalate; thermoplastic elastomer (TPE); and mixtures thereof.

5. The method of claim 4 wherein the material is selected from the group consisting of:

HDPE, PVC, PC, PP, LDPE, EPET, and PETG.

6. The method of claim 4 wherein the material further comprises a colorant such that the container is substantially opaque to light.

* * * * *